US010255517B2

(12) United States Patent
Uchiyama

(10) Patent No.: US 10,255,517 B2
(45) Date of Patent: Apr. 9, 2019

(54) INFORMATION PROCESSING APPARATUS AND INFORMATION PROCESSING METHOD

(71) Applicant: CANON KABUSHIKI KAISHA, Tokyo (JP)

(72) Inventor: Hiroyuki Uchiyama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 186 days.

(21) Appl. No.: 15/121,899

(22) PCT Filed: Mar. 24, 2015

(86) PCT No.: PCT/JP2015/059828
§ 371 (c)(1),
(2) Date: Aug. 26, 2016

(87) PCT Pub. No.: WO2015/147317
PCT Pub. Date: Oct. 1, 2015

(65) Prior Publication Data
US 2017/0017859 A1    Jan. 19, 2017

(30) Foreign Application Priority Data

Mar. 27, 2014    (JP) ................................ 2014-066802

(51) Int. Cl.
*G06F 9/46*    (2006.01)
*G06K 9/46*    (2006.01)
(Continued)

(52) U.S. Cl.
CPC ....... *G06K 9/4671* (2013.01); *G06K 9/00369* (2013.01); *G06K 9/6256* (2013.01);
(Continued)

(58) Field of Classification Search
CPC .. G06N 99/005; G06N 7/005; G06K 9/00369; G06K 9/6257; G06K 9/4671;
(Continued)

(56) References Cited

U.S. PATENT DOCUMENTS 9,367,733 B2 * 6/2016 Zhu .................... G06K 9/00369
2007/0160294 A1 * 7/2007 Asano ................ G06K 9/00288
382/190

(Continued)

FOREIGN PATENT DOCUMENTS

CN    1983303 A    6/2007
EP    2518661 A2    10/2012
(Continued)

OTHER PUBLICATIONS

Galleguillos et al., "Context Based Object Categorization: A Critical Survey," Computer Vision and Image Understanding, Jun. 1, 2010, pp. 712-722, vol. 114, No. 6.
(Continued)

*Primary Examiner* — Yon J Couso
(74) *Attorney, Agent, or Firm* — Carter, DeLuca & Farrell LLP

(57) ABSTRACT

A feature amount, and context information representing a context regarding an image are obtained from the image. The first likelihood indicating the likelihood at which the image is an image of a specific object is obtained from the feature amount. The second likelihood indicating the likelihood at which the image is an image of the specific object is obtained from the context information. Whether the image is an image of the specific object is identified using the first likelihood and the second likelihood.

9 Claims, 7 Drawing Sheets

(51) Int. Cl.
*G06N 99/00* (2019.01)
*G06K 9/00* (2006.01)
*G06K 9/62* (2006.01)
*G06N 7/00* (2006.01)

(52) U.S. Cl.
CPC ......... *G06K 9/6257* (2013.01); *G06K 9/6292* (2013.01); *G06K 9/6293* (2013.01); *G06N 7/005* (2013.01); *G06N 99/005* (2013.01)

(58) Field of Classification Search
CPC ... G06K 9/6256; G06K 9/6292; G06K 9/6293
See application file for complete search history.

(56) References Cited

U.S. PATENT DOCUMENTS

| | | | |
|---|---|---|---|
| 2009/0245579 A1 | 10/2009 | Hu | |
| 2009/0316988 A1* | 12/2009 | Xu | G06K 9/6256 382/173 |
| 2011/0026810 A1* | 2/2011 | Hu | G06K 9/6257 382/155 |
| 2012/0219211 A1 | 8/2012 | Ding et al. | |
| 2012/0275692 A1* | 11/2012 | Sagawa | G06K 9/6256 382/159 |
| 2016/0004935 A1 | 1/2016 | Uchiyama et al. | |
| 2016/0247272 A1 | 8/2016 | Nishino et al. | |

FOREIGN PATENT DOCUMENTS

| | | |
|---|---|---|
| JP | 2010-529529 A | 8/2010 |
| JP | 2011-124681 A | 6/2011 |
| JP | 5096211 B2 | 12/2012 |
| KR | 10-2007-0064269 A | 6/2007 |
| WO | 2008/148343 A1 | 12/2008 |
| WO | 2012/176317 A1 | 12/2012 |

OTHER PUBLICATIONS

Extended European Search Report dated Aug. 18, 2017 in corresponding European Patent Application No. 15769968.7, 9 pages.
Chinese Office Action dated May 3, 2018 in corresponding Chinese Patent Application No. 201580016428.8, together with English translation.
Dalal, N. et al., "Histograms of Oriented Gradients for Human Detection," IEEE Computer Society Conference on Computer Vision and Pattern Recognition, CVPR2005, Jun. 2005, pp. 1-8.
Schapire, R. et al., "Improved Boosting Algorithms Using Confidence-Rated Predictions," Machine Learning, Dec. 1999, pp. 297-336, vol. 37, No. 3, Summary by Jiao, F.
Viola, P. et al., "Robust Real-Time Object Detection," Second International Workshop on Statistical and Computational Theories of Vision—Modeling, Learning, Computing, and Sampling, IJCV2001, Jul. 2001, pp. 1-25.
Bourdev, L. et al., "Robust Object Detection Via Soft Cascade," IEEE Computer Society Conference on Computer Vision and Pattern Recognition, CVPR2005, Jun. 2005, pp. 1-8.
International Search Report and Written Opinion of the International Searching Authority dated Jun. 23, 2015 in corresponding International Application No. PCT/JP2015/059828, 8 pages.
Korean Office Action dated Mar. 30, 2018 in corresponding Korean Patent Application No. 10-2016-7029372, together with English translation.

* cited by examiner

INFORMATION PROCESSING APPARATUS AND INFORMATION PROCESSING METHOD

CROSS REFERENCE TO RELATED APPLICATIONS

This application is a U.S. National Stage entry of International Application No. PCT/JP2015/059828, filed on Mar. 24, 2015, which claims priority to Japanese Patent Application No. 2014-066802, filed on Mar. 27, 2014, the disclosures of each of which are hereby incorporated by reference herein in their entirety.

TECHNICAL FIELD

The present invention relates to a technique for detecting an object from an image.

BACKGROUND ART

There has conventionally been proposed a method of detecting a human body from an image shot by a camera (non-patent literature 1 (Navneet Dalal and Bill Triggs, "Histograms of Oriented Gradients for Human Detection", CVPR2005)). In this method, human body images and background images are learnt in advance by machine learning. After that, whether a partial image of an image input from a camera is a human body is identified to detect the human body. However, it is known that when a shooting scene or the appearance of a human body is different between the time of pre-learning and the time of detection, the detection performance degrades. Examples of the difference in shooting scene are a difference in illumination condition, and differences in camera installation angle, presence/absence of the shade, and background. Examples of the difference in appearance are differences in orientation of a human body and clothes.

A factor of degradation of the detection performance is, for example, that learning samples at the time of pre-learning cannot cover the diversities of the shooting scene and the appearance of a detection target object. To solve this, there is proposed a method of improving the detection performance by performing additional learning using learning samples for additional learning that have been collected in a shooting scene similar to that at the time of detection. Patent literature 1 (Japanese Patent Laid-Open No. 2010-529529) proposes a method of creating the weak discriminator of a Real AdaBoost discriminator by pre-learning, and then adapting the weak discriminator to an additional learning sample by additional learning.

It is also known that the detection performance is improved by using, for identification, a scene-specific context obtained in a scene at the time of detection. An example of the context is the appearance position coordinates of a detection target object in an image. For a security camera whose installation position is permanent, the appearance position or size of a human body to be detected in an image has a distribution specific to the installation scene. In patent literature 2 (Japanese Patent No. 5096211), therefore, the probability distribution of the appearance position coordinates of a human body is created and used for the front filter of a discriminator or result correction. Another example of the context is a background image. The frequency at which a detection target appears at a position having a specific background texture rises depending on the camera installation location. Hence, in patent literature 3 (US20120219211 A1), not only an identification target region, but also a partial image around the identification target region are used for learning.

However, in patent literature 1, the parameters of the Real AdaBoost discriminator are only adapted to an additional learning sample. Since features used for additional learning and detection after additional learning are limited to those generated at the time of pre-learning, improvement of the performance is limited.

Patent literature 2 assumes a permanently installed camera, and only the probability distribution of the appearance position coordinates of an object is used as a context. Therefore, improvement of the performance cannot be expected in a situation in which the camera is not permanently installed or a situation in which the appearance probability of an object does not depend on the position coordinates.

In patent literature 3, only a partial image around the identification target region can be used as a context. Improvement of the performance cannot be expected in a situation in which a background image changes over time or a situation in which the appearance probability of an object does not depend on the background.

SUMMARY OF INVENTION

The present invention has been made to solve the above problems, and provides a technique for improving the identification performance for an image.

According to the first aspect of the present invention, there is provided an information processing apparatus comprising: means configured to obtain a feature amount from an input image; means configured to obtain context information representing a context regarding the image; a first identification means configured to obtain, from the feature amount, a first likelihood indicating a likelihood at which the image is an image of a specific object; a second identification means configured to obtain, from the context information, a second likelihood indicating a likelihood at which the image is an image of the specific object; and means configured to identify, by using the first likelihood and the second likelihood, whether the image is an image of the specific object, wherein the second identification means includes a discriminator learnt using the first likelihood and the context information.

According to the second aspect of the present invention, there is provided an information processing apparatus comprising: means configured to obtain a feature amount from an input image; means configured to obtain context information representing a context regarding the image; a first identification means configured to obtain, from the feature amount, a first likelihood indicating a likelihood at which the image is an image of a specific object; and a learning means configured to learn a second identification means being different from the first identification means by using the first likelihood and the context information.

According to the third aspect of the present invention, there is provided an information processing method to be performed by an information processing apparatus, comprising: a step of causing means configured to obtain a feature amount of the information processing apparatus, to obtain a feature amount from an input image; a step of causing means configured to obtain context information of the information processing apparatus, to obtain context information representing a context regarding the image; a first identification step of causing a first identification means of the information processing apparatus to obtain, from the feature amount, a first likelihood indicating a likelihood at which the image is an image of a specific object; a second identification step of causing a second identification means of the information processing apparatus to obtain, from the context information, a second likelihood indicating a likelihood at which the image is an image of the specific object; and a step of causing an identification means of the information processing apparatus to identify, by using the first likelihood and the second likelihood, whether the image is an image of the specific object, wherein the second identification means includes a discriminator learnt using the first likelihood and the context information.

According to the fourth aspect of the present invention, there is provided an information processing method to be performed by an information processing apparatus, comprising: a step of causing means configured to obtain a feature amount of the information processing apparatus, to obtain a feature amount from an input image; a step of causing means configured to obtain context information of the information processing apparatus, to obtain context information representing a context regarding the image; a first identification step of causing a first identification means of the information processing apparatus to obtain, from the feature amount, a first likelihood indicating a likelihood at which the image is an image of a specific object; and a learning step of causing a learning means of the information processing apparatus to learn a second identification means being different from the first identification means by using the first likelihood and the context information.

Further features of the present invention will become apparent from the following description of exemplary embodiments (with reference to the attached drawings).

DESCRIPTION OF EMBODIMENTS

Embodiments of the present invention will now be described with reference to the accompanying drawings. Note that each embodiment to be described below will exemplify a case where the present invention is specifically carried out, and is a specific embodiment of an arrangement described in the scope of claims.

First Embodiment

Figure 1:
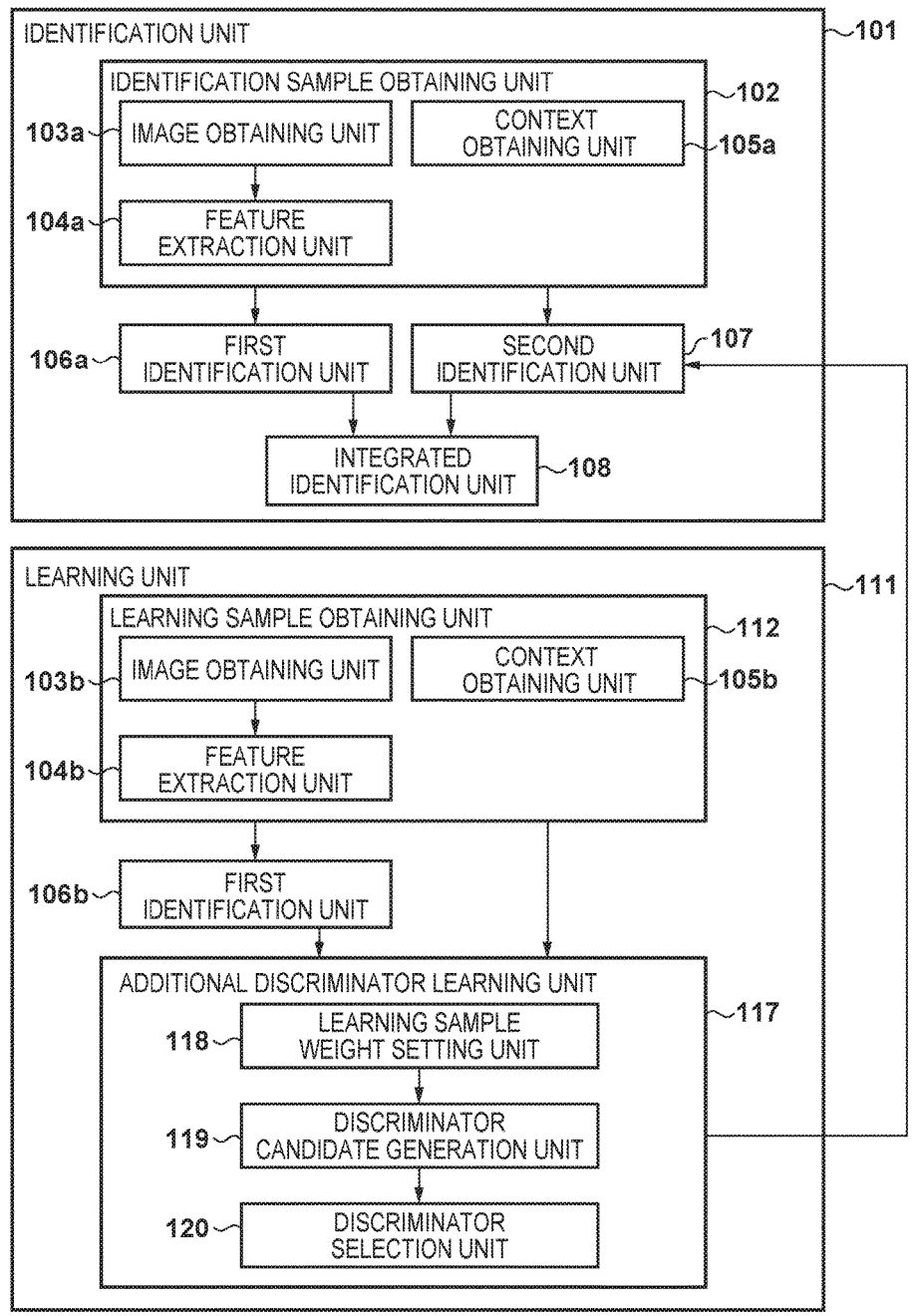
FIG. 1 is a block diagram showing an example of the functional arrangement of an information processing apparatus.

An example of the functional arrangement of an information processing apparatus according to the first embodiment will be explained first with reference to the block diagram of FIG. 1. As shown in FIG. 1, the information processing apparatus according to this embodiment includes an identification unit 101 and a learning unit 111.

The learning unit 111 learns a second identification unit 107 of the identification unit 101 from identification target images and contexts accompanying them. The "identification target images" are images in which images of a detection target object and background images coexist.

From results of identification processing on an input image by a first identification unit 106a and the second identification unit 107 learnt by the learning unit 111, the identification unit 101 identifies whether the input image is an image in which a specific object has been captured.

Note that this embodiment will describe that the learning unit 111 and the identification unit 101 are arranged in one apparatus (information processing apparatus). However, the learning unit 111 and the identification unit 101 may be arranged in separate apparatuses. In this case, the learning unit 111 and the identification unit 101 communicate with each other to achieve the following processing by communication between them.

First, the learning unit 111 will be explained. A learning sample obtaining unit 112 obtains a plurality of identification target images, and collects the image feature vectors of the identification target images and context feature vectors attached to the identification target images from the respective identification target images. The learning sample obtaining unit 112 generates, for each identification target image, a learning sample by joining the image feature vector and context feature vector collected from the identification target image. In addition, the learning sample obtaining unit 112 receives classification labels for the respective identification target images. The classification label is a numerical value indicating whether the learning sample (identification target image) is a detection target object. The classification label takes +1 when the learning sample is a detection target object, and −1 when the learning sample is a background. A classification label obtaining method will be described later. The learning sample obtaining unit 112 sends, for each identification target image, a learning sample generated from the identification target image, and a classification label for the identification target image to a first identification unit 106b and an additional discriminator learning unit 117.

An image obtaining unit 103b obtains a plurality of identification target images, and classification labels for the identification target images. A feature extraction unit 104b extracts image feature vectors from the identification target images obtained by the image obtaining unit 103b. A context obtaining unit 105b obtains context feature vectors attached to the identification target images obtained by the image obtaining unit 103b. The image feature vectors extracted by the feature extraction unit 104b, and the context feature vectors obtained by the context obtaining unit 105b are sent to the first identification unit 106b and the additional discriminator learning unit 117 as learning samples together with the classification labels in a state in which the image feature vectors and the context feature vectors are joined.

The first identification unit 106b calculates a first likelihood indicating the likelihood of a detection target object for an image feature vector in each learning sample input from the learning sample obtaining unit 112. This embodiment will explain that the first identification unit 106b is constituted by a Real AdaBoost discriminator. However, the first identification unit 106b may be constituted by Support Vector Machine, a neural network, Regression, or another discriminator as long as the discriminator can obtain the likelihood. The "likelihood of a detection target object"

represents the likelihood of a detection target object for an image feature vector input to the discriminator constituting the first identification unit 106b, and indicates that the image feature vector is more likely to represent the detection target object as the value is larger. A method of calculating the first likelihood will be described later. When the first identification unit 106b is constituted by a Real AdaBoost discriminator, the discriminator is constituted as a set of weak discriminators. When Support Vector Machine, a neural network, or Regression is used, the discriminator is constituted as a single discriminator. Assume that the discriminator constituting the first identification unit 106b has been learnt in advance using identification target images obtained in advance. The first identification unit 106b sends the calculated first likelihood to the additional discriminator learning unit 117 on the subsequent stage.

The additional discriminator learning unit 117 creates a set of weak discriminators constituting the second identification unit 107 of the identification unit 101 by using the learning samples and classification labels input from the learning sample obtaining unit 112, and the first likelihood input from the first identification unit 106b.

A learning sample weight setting unit 118 performs initial setting and updating of a weight on a learning sample. A discriminator candidate generation unit 119 generates weak discriminator candidates and their evaluation scores from learning samples and their weights, and inputs them to a discriminator selection unit 120. The discriminator selection unit 120 selects a desired weak discriminator based on the evaluation scores, and updates the second identification unit 107.

Next, the identification unit 101 will be explained.

An identification sample obtaining unit 102 obtains an identification target image and collects, from the identification target image, the image feature vector of the identification target image and a context feature vector attached to the identification target image. The identification sample obtaining unit 102 generates an identification sample by joining the image feature vector and context feature vector collected from the identification target image, and sends the identification sample to the first identification unit 106a and the second identification unit 107.

An image obtaining unit 103a obtains an identification target image. Similar to the feature extraction unit 104b, a feature extraction unit 104a extracts an image feature vector from the identification target image obtained by the image obtaining unit 103a. A context obtaining unit 105a obtains a context feature vector attached to the identification target image obtained by the image obtaining unit 103a. The image feature vector extracted by the feature extraction unit 104a, and the context feature vector obtained by the context obtaining unit 105a are sent to the first identification unit 106a and the second identification unit 107 as an identification sample in a state in which the image feature vector and the context feature vector are joined.

The first identification unit 106a calculates a likelihood (first likelihood) indicating the likelihood of a detection target object for an image feature vector in an identification sample input from the identification sample obtaining unit 102. The first identification unit 106a sends the calculated first likelihood to an integrated identification unit 108 on the subsequent stage.

Note that the first identification units 106a and 106b are learnt in advance in the same way and perform the same operation. Thus, a single discriminator may be shared and used as the first identification units 106a and 106b, or two discriminators generated by performing the same learning may be used as the first identification units 106a and 106b.

The second identification unit 107 calculates a second likelihood indicating the likelihood of a detection target object for an identification sample input from the identification sample obtaining unit 102. The second identification unit 107 sends the calculated second likelihood to the integrated identification unit 108 on the subsequent stage.

By using the first likelihood input from the first identification unit 106a and the second likelihood input from the second identification unit 107, the integrated identification unit 108 determines whether the identification sample is a detection target object.

Figure 3:
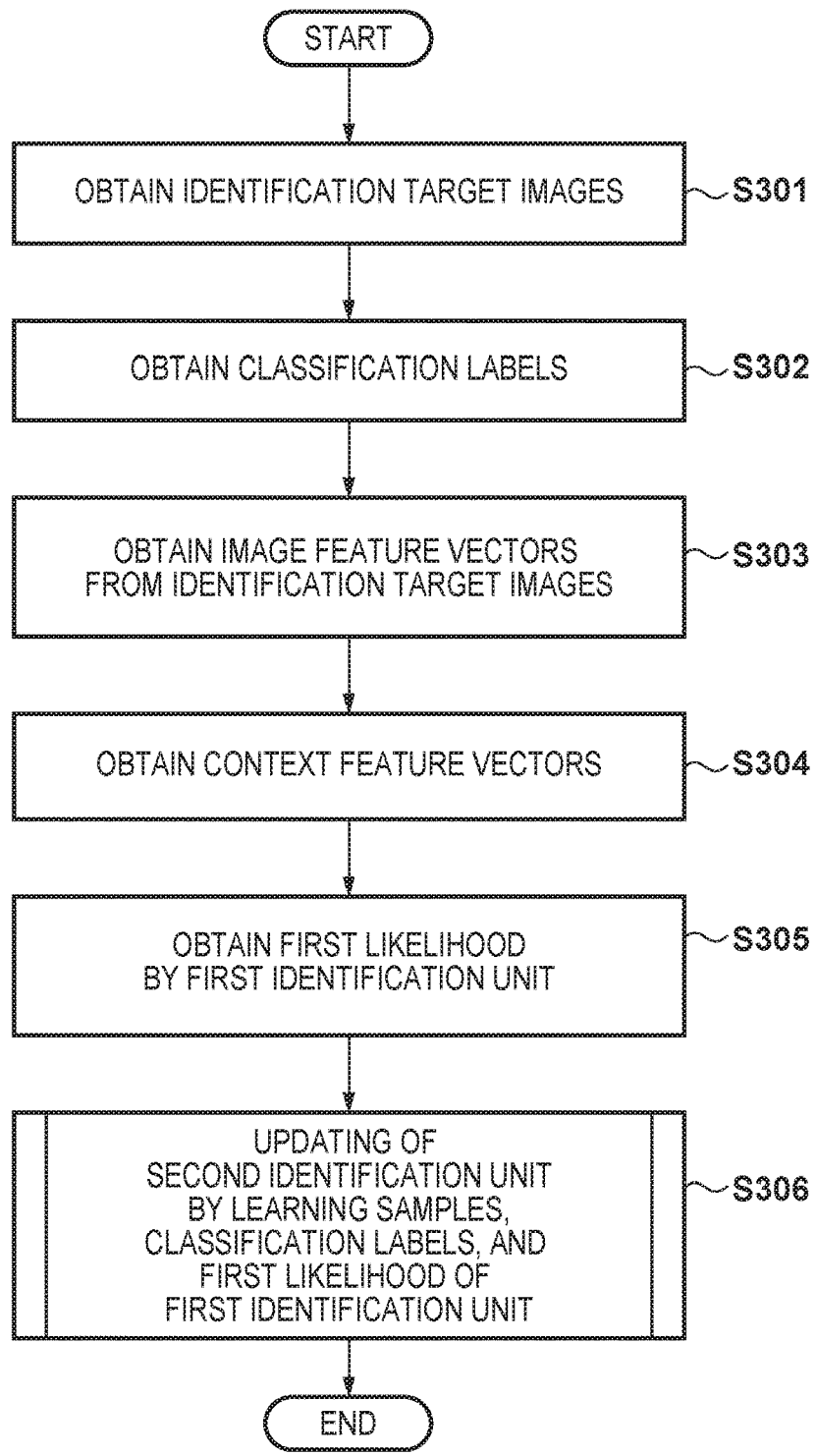
FIG. 3 is a flowchart showing processing to be performed by a learning unit 111.

Next, processing to be performed by the learning unit 111 in FIG. 1 will be explained with reference to FIG. 3 that is a flowchart showing this processing. In step S301, the image obtaining unit 103b obtains a plurality of identification target images. In step S302, the image obtaining unit 103b obtains classification labels for the respective identification target images.

As described above, an identification target image is either an image of a detection target object or a background image. In step S301, images in which images of the detection target object and background images coexist are obtained. For example, the user may designate in advance identification target images and classification labels. When identification target images are obtained from a moving image, tracking processing or the like may be applied to the detection target object to automatically obtain identification target images and their classification labels from the tracking results.

In step S303, the feature extraction unit 104b extracts image feature vectors from the respective identification target images obtained in step S301. In this embodiment, an HOG (Histograms of Oriented Gradients) is extracted as an image feature vector from an identification target image. However, the image feature vector is not limited to the HOG, and an LBP (Local Binary Pattern), the luminance value of an image, or another arbitrary feature amount may be extracted as an image feature vector.

Figure 7:
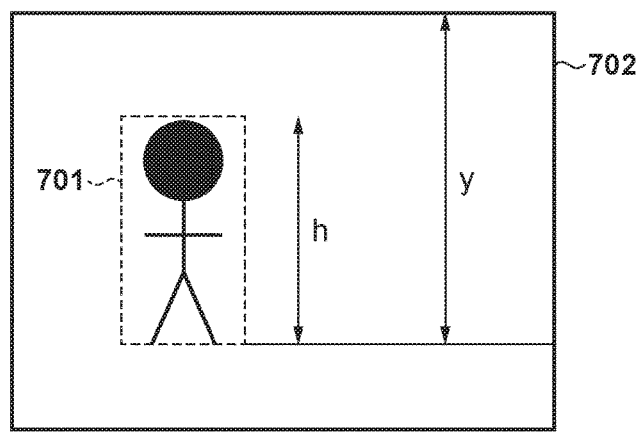
FIG. 7 is a view for explaining a context feature vector.

In step S304, the context obtaining unit 105b obtains context feature vectors attached to the identification target images from the respective identification target images obtained in step S301. In this embodiment, appearance position information of the detection target object is extracted as a context feature vector. More specifically, as shown in FIG. 7, the position coordinate and size of an identification target image 701 in an input image 702 (original image from which the identification target image 701 has been extracted) from which the identification target image 701 has been obtained are used as a context. That is, a height h of the extraction frame of the identification target image 701, and the y-coordinate of the lower portion of the extraction frame are obtained. Then, the ratio of the height h of the extraction frame and the y-coordinate of the lower portion of the extraction frame, and the reciprocal of the height h are set as a context feature vector. At this time, a context feature vector c is c=(y/h, 1/h).

As described above, the learning sample obtaining unit 112 sends, to the first identification unit 106b, a learning sample obtained by joining the image feature vector extracted from the identification target image and the context feature vector obtained from the identification target image for each identification target image.

In step S305, the first identification unit 106b calculates a first likelihood $H_1(v)$ for an image feature vector v in each learning sample input from the learning sample obtaining unit 112. The first likelihood $H_1(v)$ is calculated according to:

$$H_1(v) = \sum_{h_1 \in H_1} h_1(v) \qquad (1)$$

In equation (1), $h_1(v)$ represents the weak discriminator in the first identification unit 106b and is calculated according to:

$$h_1(v) = \frac{1}{2} \ln \frac{W_+^{J(u)} + \varepsilon}{W_-^{J(u)} + \varepsilon} \qquad (2)$$

where $\varepsilon$ is the constant, $W_+^j$ and $W_-^j$ are the one-dimensional histograms having a bin number j, u is the element value of a dimension determined in advance in the image feature vector v, and J(u) is the conversion table for converting u into a bin number of the one-dimensional histogram.

Figure 4:
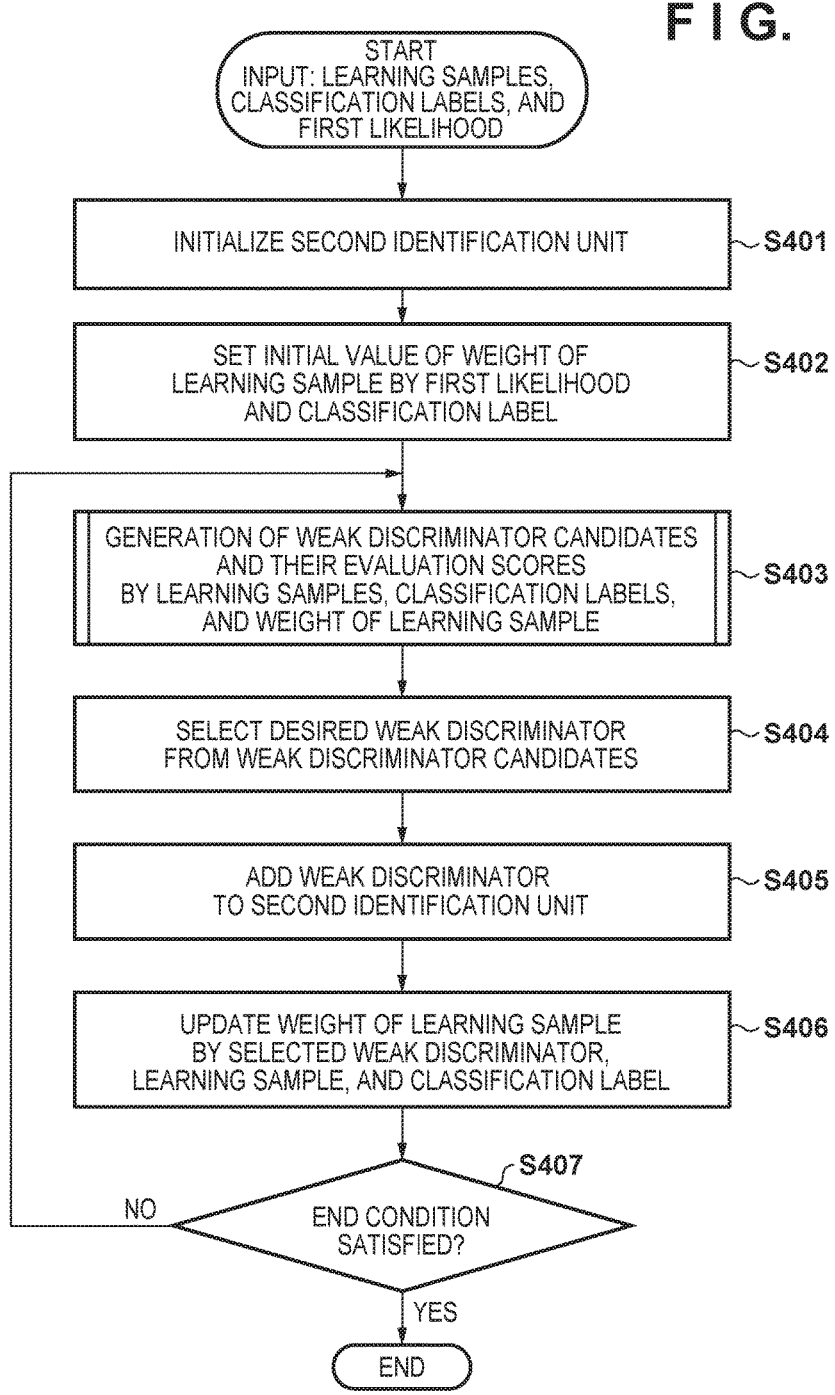
FIG. 4 is a flowchart showing details of processing in step S306.

In step S306, the additional discriminator learning unit 117 updates the second identification unit 107 by using learning samples, classification labels, and first likelihoods. Details of the processing in step S306 will be explained with reference to the flowchart of FIG. 4. In step S306, learning samples and classification labels are learnt using a so-called Boosting learning algorithm, and the second identification unit 107 is updated. Boosting is a method of superposing many weak discriminators to generate a strong discriminator. In this embodiment, each weak discriminator constituting the second identification unit 107 learns at least either of an image feature vector and a context feature vector. A feature of the learning algorithm in this embodiment is that a discriminator constituting the first identification unit 106b is handled as one of learnt weak discriminators in Boosting and many weak discriminators are added to the second identification unit 107.

First, in step S401, the additional discriminator learning unit 117 initializes the second identification unit 107. In this initialization, a set of weak discriminators constituting the second identification unit 107 is set to be an empty set.

Then, in step S402, the sample weight setting unit 118 initializes a weight on each learning sample. According to non-patent literature 2 (Robert E. Schapire and Yoram Singer, "Improved Boosting Algorithms Using Confidence-rated Predictions", Machine Learning, 1999), the Boosting learning algorithm can construct a discriminator with higher identification performance by weighting a learning sample by the identification result of a learnt discriminator, and sequentially adding weak discriminators.

In this embodiment, learning starts with a larger weight for a sample for which identification by the first identification unit 106b is more difficult, and a smaller weight for a sample for which identification is easier. The weight of a learning sample is obtained as a value by normalizing a loss generated when a learning sample is identified by a discriminator constituting the first identification unit 106b, so that the sum of all sample weights becomes 1. For example, when the discriminator constituting the first identification unit 106b is a Real AdaBoost discriminator, the initial value of a weight $w_i$ of the learning sample is calculated according to:

$$w_i = \frac{\exp(-y_i H_1(v_i))}{\sum_i \exp(-y_i H_1(v_i))} \qquad (3)$$

where i is the number of a learning sample, $H_1(v_i)$ is the "likelihood of a discriminator $H_1$ constituting the first identification unit 106b for an image feature vector $v_i$" (first likelihood) obtained in step S305, and $y_i$ is the classification label. Equation (3) is based on a Real AdaBoost exponential loss function, and a desired loss function is employed in accordance with a discriminator used in the first identification unit 106b.

This setting of the weight of the learning sample gives an effect of efficiently learning, in the second identification unit 107, a scene-specific learning sample for which identification by the discriminator $H_1$ constituting the first identification unit 106b is poor. Also, the second identification unit 107 expects an effect of complementing the identification performance of the first identification unit 106b for a specific scene.

In step S403, the discriminator candidate generation unit 119 generates weak discriminator candidates and their evaluation scores by using learning samples, classification labels, and the weights of the learning samples. The evaluation score of a weak discriminator candidate is an index indicating the identification performance of the weak discriminator candidate, and a smaller value represents higher identification performance. Details of the processing in step S403 will be described later with reference to FIG. 5.

In step S404, the discriminator selection unit 120 selects a desired weak discriminator based on these evaluation scores from the weak discriminator candidates generated in step S403. As a desired weak discriminator, a weak discriminator candidate with a smallest evaluation score is selected from the weak discriminator candidates in this embodiment.

In step S405, the discriminator selection unit 120 adds the weak discriminator selected in step S404 to a set of weak discriminators constituting the second identification unit 107.

In step S406, the learning sample weight setting unit 118 updates the weight $w_i$ of the learning sample in accordance with the weak discriminator h selected in step S404, the learning sample $x_i$, and the classification label $y_i$ according to:

$$w_i \leftarrow w_i \exp(-y_i h(x_i)) \qquad (4)$$

After updating each weight according to expression (4), the respective weights are normalized so that the sum of all the weights becomes 1. In step S407, the additional discriminator learning unit 117 determines whether the end condition of learning is satisfied. In this embodiment, when the positive rejection ratio is smaller than a predetermined threshold and the negative rejection ratio is larger than a predetermined threshold, it is determined that the end condition is satisfied; otherwise, it is determined that the end condition is not satisfied.

The positive rejection ratio is a ratio at which the learning sample of a detection target object is erroneously identified as a background. The negative rejection ratio is a ratio at which the learning sample of a background is correctly identified. Note that various conditions are applicable as end conditions of learning, and the end condition is not limited to a specific condition. For example, when the processes in steps S401 to S406 have been executed a predetermined number of times or more, it may be determined that the end condition is satisfied.

If it is determined in step S407 that the end condition has been satisfied, the learning processing ends. If it is determined that the end condition has not been satisfied yet, the process returns to step S403 to repeat the subsequent processing.

Figure 5:
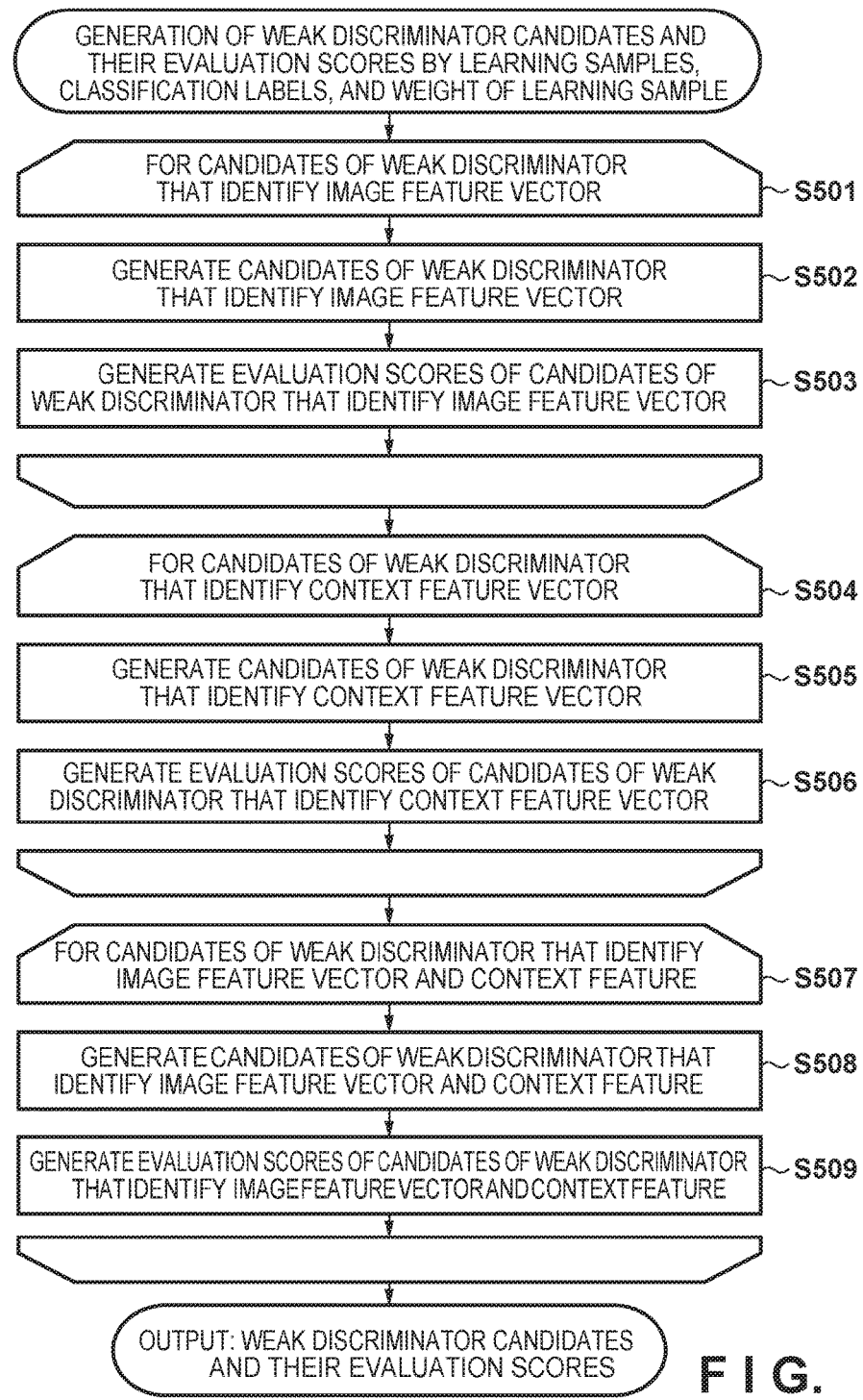
FIG. 5 is a flowchart showing details of processing in step S403.

Details of the processing in step S403 will be explained with reference to the flowchart of FIG. 5. The processing in FIG. 5 is processing for generating candidates of a weak determiner that identifies an image feature vector, candidates of a weak determiner that identifies a context feature vector, and candidates of a weak determiner that identifies a combination of an image feature vector and context feature vector. More specifically, in the loop (steps S502 and S503) of step S501, candidates of the weak determiner that identifies an image feature vector are generated, and the evaluation scores of the respective candidates are calculated. In the loop (steps S505 and S506) of step S504, candidates of the weak determiner that identifies a context feature vector are generated, and the evaluation scores of the respective candidates are calculated. In the loop (steps S508 and S509) of step S507, candidates of the weak determiner that identifies a combination of an image feature vector and context feature vector are generated, and the evaluation scores of the respective candidates are calculated.

First, the loop (steps S502 and S503) of step S501 will be explained, in which generation of candidates of the weak discriminator that identifies an image feature vector, and calculation of their evaluation scores are performed. In the loop of step S501, weak discriminator candidates and their evaluation scores are generated for respective dimensions in an image feature vector. That is, weak discriminator candidates and their evaluation scores are generated by the number of dimensions of the image feature vector.

This embodiment assumes that weak discriminators and their evaluation scores are obtained based on Real AdaBoost in non-patent literature 2. According to non-patent literature 2, a Real AdaBoost weak discriminator takes a form as represented by:

$$h(x) = \frac{1}{2}\ln\frac{P(y=+1|x)}{P(y=-1|x)} \quad (5)$$

where x is the learning sample, y is the classification label of the learning sample, and $P(y=+1|x)$ and $P(y=-1|x)$ are probability density distributions weighted by the weight of the learning sample.

In step S502, the discriminator candidate generation unit 119 generates candidates of the weak determiner that identifies an image feature vector. Here, a method of generating weak discriminator candidates in an element of an arbitrary dimension of an image feature vector will be explained. According to non-patent literature 2, the weak discriminator candidate in equation (5) is further rewritten into:

$$h_{image}(x) = \frac{1}{2}\ln\frac{W_+^{J(u)}+\varepsilon}{W_-^{J(u)}+\varepsilon} \quad (6)$$

where x is the learning sample, $\varepsilon$ is the constant, $W_+^j$ and $W_-^j$ are the one-dimensional histograms having a bin number j, u is the element value of an arbitrary dimension of the image feature vector in the learning sample x, and J(u) is the conversion table for converting u into a bin number of the one-dimensional histogram.

Each of the one-dimensional histograms $W_+^j$ and $W_-^j$ is obtained by converting a feature amount into a bin number based on the conversion table J, and accumulating a learning sample weight corresponding to the bin:

$$z = \sum_i w_i \exp(-y_i h(x_i)) \quad (12)$$

where j is the bin number of the one-dimensional histogram, i is the number of the learning sample, and $y_i$ and $u_i$ are the classification label of the ith learning sample and an arbitrary element value of an image feature in the learning sample, respectively.

In step S503, the discriminator candidate generation unit 119 calculates an evaluation score z of a weak discriminator candidate $h_{image}$ generated in step S502. The evaluation score z is calculated according to, for example:

$$W_+^j = \sum_{i:J(u_i)=j \cap y_i=+1} w_i \quad (7-1)$$

$$W_-^j = \sum_{i:J(u_i)=j \cap y_i=-1} w_i \quad (7-2)$$

By the above-described loop (processes in steps S502 and S503) of step S501, candidates of the weak discriminator that identifies an image feature vector are generated, and their evaluation scores are calculated.

Next, the loop (steps S505 and S506) of step S504 will be explained, in which generation of candidates of the weak discriminator that identifies a context feature vector, and calculation of their evaluation scores are performed. A plurality of weak discriminator candidates may be generated in this loop. However, this embodiment assumes that the repetition count is only one in order to generate a single weak discriminator candidate.

In step S505, the discriminator candidate generation unit 119 generates candidates of the weak determiner that identifies a context feature vector. Processing of generating a weak discriminator candidate from a context feature vector will be explained in more detail. A candidate of the weak discriminator that identifies a context feature vector is given similarly based on Real AdaBoost:

$$z = 2\sum_j \sqrt{W_+^j W_-^j} \quad (8)$$

where x is the learning sample, c is the context feature vector in the learning sample, y is the classification label, $P(c|y=+1)$ and $P(c|y=-1)$ are the probability density distributions of the context feature vectors of a detection target object and background weighted by the weight of the learning sample, respectively, and $P(y=+1)$ and $P(y=-1)$ are the distributions of the classification labels of the detection object and background, respectively.

Figure 8:
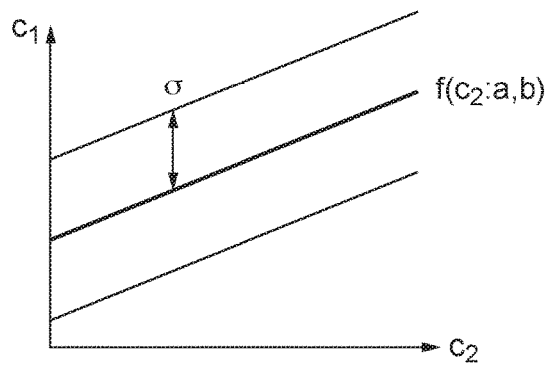
FIG. 8 is a graph for explaining equation (11)

Next, a method of calculating the probability density distribution $P(c|y=+1)$ in equation (9) will be explained. The context feature vector obtained in step S304 is a vector defined by the ratio of the height h of the extraction frame and the y-coordinate of the lower portion of the extraction frame, and the reciprocal of the height h. The context feature vector is c=(y/h, 1/h), which is represented by c=($c_1$, $c_2$) here. Assuming that the height of the detection target object is almost constant, and the installation height of a camera and the y-coordinate of a horizontal line in an image are constant, $c_1$ is expressed as a linear function f($c_2$:a, b) of $c_2$:

$$f(c_2:a,b) \equiv c_1 = ac_2 + b \quad (10)$$

where a and b are the coefficients of the linear function. It is considered that an error is generated in observation of a context feature vector. It is also considered that the height of a detection target object is not constant in practice. Assuming that a normal distribution error is generated in a context feature vector, the probability distribution P(c|y=+1) in equation (9) is given by:

$$h_{context}(x) = \frac{1}{2} \ln \frac{P(y=+1|c)}{P(y=-1|c)} \quad (9)$$
$$= \frac{1}{2} \ln \frac{P(c|y=+1)P(y=+1)}{P(c|y=-1)P(y=-1)}$$

where P($c_1$|f($c_2$:a, b), $\sigma^2$) is the normal distribution with the mean f($c_2$:a, b) and the variance $\sigma^2$. Equation (11) means that the context feature vector is likely to represent a detection target object as the context feature vector c=($c_1$, $c_2$) is closer to the straight line f($c_2$:a, b) shown in FIG. 8.

The parameters a, b, and $\sigma^2$ in equation (11) are obtained by maximum likelihood estimation from the weight of the learning sample and the context feature vector. P($c_2$|y=+1) is assumed to be a uniform distribution.

As for the probability density distribution P(c|y=−1) in equation (9), assume that the learning sample of a background appears uniformly in a scene. Thus, P(c|y=−1) is regarded as a uniform distribution.

This embodiment assumes the geometrical model of the positional relationship between a camera and a detection target object. Estimation of the probability density distribution becomes robust to noise, and an effect of increasing the accuracy of estimation of the probability density distribution can be expected. Further, an effect of estimating an accurate probability density distribution using a smaller number of learning samples can be expected in comparison with a case in which no geometrical model is considered.

In this embodiment, P($c_2$|y=+1) in equation (11) and P(c|y=−1) in equation (9) are uniform distributions. However, it is also possible to use the weight of a learning sample and a context feature vector, and obtain P($c_2$|y=+1) and P(c|y=−1) by maximum likelihood estimation by applying them to any model, like P(c|y=+1) in equation (9). Alternately, P($c_2$|y=+1) and P(c|y=−1) may be obtained by kernel density estimation or voting using the weight of a learning sample and a context feature vector.

In step S506, the discriminator candidate generation unit 119 generates the evaluation score z of the weak discriminator candidate $h_{context}$. The evaluation score z is calculated according to, for example:

$$P(c|y=+1) = P(c_1|c_2, y=+1)P(c_2|y=+1) \quad (11)$$
$$= N(c_1|f(c_2:a,b), \sigma^2)P(c_2|y=+1)$$

where i is the number of a learning sample, $w_i$ is the weight of the learning sample, $x_i$ is the learning sample, $y_i$ is the classification label, and h is a weak discriminator candidate, which is $h_{context}$ here.

By the above-described loop (processes in steps S505 and S506) of step S504, candidates of the weak discriminator that identifies a context feature vector are generated, and their evaluation scores are calculated.

Next, the loop (steps S508 and S509) of step S507 will be explained, in which generation of candidates of the weak discriminator that identifies a combination of an image feature vector and context feature vector, and calculation of their evaluation scores are performed. In the loop of step S507, as in the loop of step S501, a weak discriminator candidate and its evaluation score are generated for each dimension in an image feature vector. That is, weak discriminator candidates and their evaluation scores are generated by the number of dimensions of the image feature vector.

In step S508, the discriminator candidate generation unit 119 generates candidates of the weak determiner that identifies a combination of an image feature vector and context feature vector. Processing of generating a weak discriminator candidate from a combination of an image feature vector and context feature vector will be explained in more detail. A candidate of the weak discriminator that identifies an image feature vector and a context feature vector is given similarly based on Real AdaBoost:

$$h_{joint}(x) = \frac{1}{2} \ln \frac{P(y=+1|x)}{P(y=-1|x)} \quad (13)$$
$$= \frac{1}{2} \ln \frac{P(x|y=+1)P(y=+1)}{P(x|y=-1)P(y=-1)}$$

where x is the learning sample, and y is the classification label. Although equation (13) may be used as the weak discriminator candidate, equation (13) is approximated using the naive Bayes method:

$$h_{joint}(x) \approx \frac{1}{2} \ln \frac{P(v|y=+1)P(c|y=+1)P(y=+1)}{P(v|y=-1)P(c|y=-1)P(y=-1)} \quad (14)$$
$$= \frac{1}{2} \ln \frac{P(v|y=+1)P(y=+1)}{P(v|y=-1)P(y=-1)} + \frac{1}{2} \ln \frac{P(c|y=+1)}{P(c|y=-1)}$$
$$= \frac{1}{2} \ln \frac{W_+^j}{W_-^j} + \frac{1}{2} \ln \frac{P(c|y=+1)}{P(c|y=-1)}$$

where x is the learning sample, v is the image feature vector in the learning sample, and c is the context feature vector in the learning sample. The one-dimensional histograms $W_+^j$ and $W_-^j$ in equation (14) are calculated according to the above-described equations (7-1) and (7-2). Also, P(c|y=+1) and P(c|y=−1) in equation (14) are calculated as in equation (9).

In step S509, the discriminator candidate generation unit 119 calculates the evaluation score z of the weak discriminator candidate $h_{joint}$. The evaluation score z is obtained according to, for example, equation (12).

By the above-described loop (processes in steps S508 and S509) of step S507, candidates of the weak discriminator that identifies a combination of an image feature vector and context feature vector are generated, and their evaluation scores are calculated.

Then, the discriminator candidate generation unit 119 sends the weak discriminator candidates generated according to the flowchart of FIG. 5 and the evaluation scores of the respective weak discriminator candidates to the discriminator selection unit 120.

Figure 6:
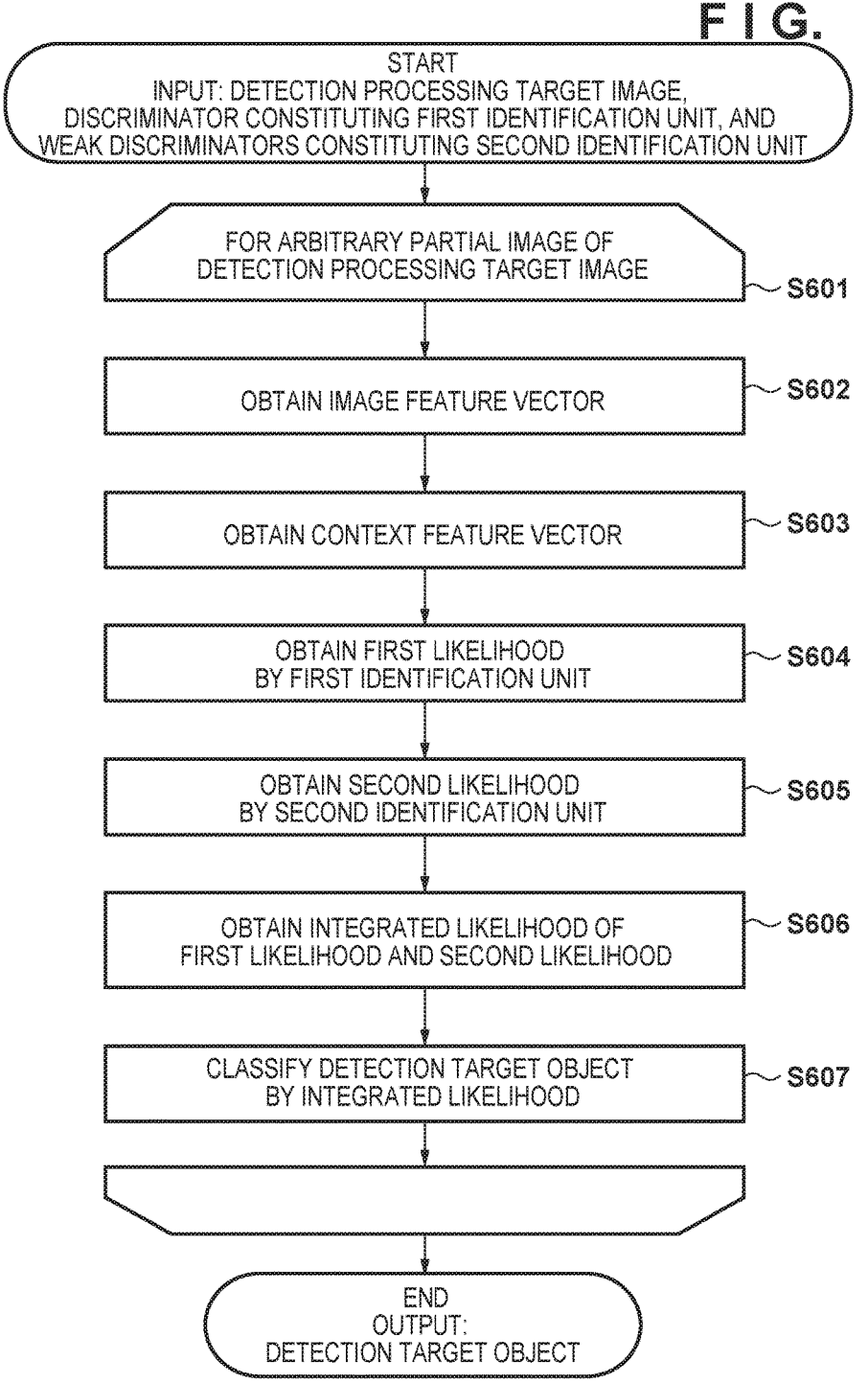
FIG. 6 is a flowchart showing processing to be performed by an identification unit 101.

Next, processing to be performed by the identification unit 101 including the second identification unit 107 learnt by the learning unit 111 will be explained with reference to FIG. 6 that is a flowchart showing this processing. The loop (steps S602 to S607) of step S601 is performed for respective partial images (that may be designated by the user or by the identification unit 101) in an identification target image (detection target image) input to the identification sample obtaining unit 102.

In step S602, the image obtaining unit 103a obtains an arbitrary partial image in the identification target image, and the feature extraction unit 104a extracts the image feature vector v from the obtained partial image, as in step S303 described above.

In step S603, the context obtaining unit 105a obtains a context feature vector attached to the identification target image, as in step S304 described above.

In step S604, the first identification unit 106a calculates the first likelihood $H_1(v)$ of the first identification unit 106a according to the above-described equation (1) for the image feature vector v extracted in step S602. The first likelihood $H_1(v)$ is a numerical value indicating the likelihood of a detection target object for the partial image obtained in step S602.

In step S605, the second identification unit 107 calculates a second likelihood $H_2(x)$ of the second identification unit 107 for a vector x obtained by joining the image feature vector v extracted in step S602 and the context feature vector obtained in step S603. The second likelihood is a numerical value indicating the likelihood of an identification target object for the partial image obtained in step S602. As represented by equation (15), the second likelihood $H_2(x)$ is calculated by the sum of likelihoods by weak discriminators h constituting $H_2$ serving as the second identification unit 107:

$$H_2(x) = \sum_{h \in H_2} h(x) \quad (15)$$

In equation (15), the evaluation of the weak discriminator h that has been generated in step S502 and constitutes the second identification unit 107 ($H_2$) uses only the image feature vector v in the identification sample x. The evaluation of the weak discriminator h that has been generated in step S505 and constitutes the second identification unit 107 ($H_2$) uses only the context feature vector c in the identification sample x. Further, the evaluation of the weak discriminator h that has been generated in step S508 and constitutes the second identification unit 107 ($H_2$) uses both the image feature vector v and the context feature vector c in the identification sample x.

In step S606, the integrated identification unit 108 calculates an integrated likelihood $H(x)$ of the first likelihood $H_1(v)$ calculated in step S604 and the second likelihood $H_2(x)$ calculated in step S605. The integrated likelihood $H(x)$ is calculated by weighting the second likelihood $H_2(x)$ by a coefficient λ and adding the result to the first likelihood $H_1(v)$:

$$H(x) = H_1(v) + \lambda H_2(x) \quad (16)$$

where x is the identification sample, which is obtained by joining the image feature vector v and the context feature vector c. The coefficient λ is a value indicating the ratio of the strengths of the first identification unit 106a and second identification unit 107, and takes a value of 0 to 1. When λ is 0, the identification result is the same as that by only the discriminator $H_1$ constituting the first identification unit 106a. As λ becomes larger, this indicates that the degree of adaptation to the scene is larger. Therefore, by adjusting the coefficient λ, an effect of suppressing degradation of the detection performance caused by over-learning can be expected.

In step S607, if the integrated likelihood $H(x)$ calculated in step S606 is larger than a predetermined constant value, the integrated identification unit 108 classifies the partial image obtained in step S602 into the detection target object.

After the loop of step S601 is performed for the respective partial images in the identification target image, the integrated identification unit 108 outputs a set of partial images classified into the detection target object in step S607. The output destination and output form are not limited to specific ones. As the output, a partial image itself may be output, or information (for example, a position and size in an identification target image, or a recognition result in a partial image) regarding a partial image may be output.

In this embodiment, the initial value of the weight of a learning sample is set based on the first likelihood obtained by the first identification unit from each of the identification target images in step S402. At this time, the second identification unit performs learning based on the first likelihood identified by the first identification unit. Hence, the second identification unit expects an effect of efficiently learning, at high accuracy, identification target images for which identification by the first identification unit is poor.

Since the first identification unit and the second identification unit are learnt by the same Boosting framework via the first likelihood of the first identification unit, the first likelihood of the first identification unit and the second likelihood of the second identification unit are connected by addition/subtraction. It is therefore possible to separately learn a plurality of types of second identification units using different learning samples, and update and replace them by the detection unit. The detection unit can selectively switch a plurality of contexts learnt from the different learning samples. For example, when the camera is fixed to a tripod, a second identification unit that learns a coordinate as a context can be used. When the camera is not fixed, a second identification unit that learns another context can be used.

Further, an event in which a context learnt by a given second identification unit and a context learnt by another second identification unit are independent, for example, a case in which the contexts are a coordinate on an image and the time will be examined. In this case, the second likelihoods of these second identification units are not correlated, so these second identification units can be used together to integrate all the second likelihoods. Accordingly, a given context of a given learning sample and a different context can be simultaneously adapted.

In this embodiment, a weak discriminator that identifies an image feature vector, a weak discriminator that identifies a context feature vector, and a weak discriminator that identifies an image feature vector and a context feature vector are generated in step S403. An effect of generating these three types of weak discriminators will be explained.

First, the effect of the weak discriminator that identifies an image feature vector will be explained. When a conventional image detection technique is adapted to a given scene, the conventional image detection technique, that is, the detection performance of the first identification unit degrades in only the given scene. The reason of this phenomenon is the presence of a scene-specific image feature. For example, a scene in which a specific portion of a detection target object tends to be hidden has an image feature specific to the hidden portion. An image feature necessary for identification changes upon a change of the posture of a detection target object or an image obtaining environment. Further, in a scene in which a characteristic object tends to be reflected at the background portion of a detection target object in the detection processing target image, an object-specific image feature exists around the object. For this reason, by newly generating a weak discriminator based on an image feature vector in the second identification unit, additional learning of a scene-specific image feature becomes possible, and improvement of the detection rate can be expected.

The effect of the weak discriminator that identifies a context feature vector will be explained. For example, when an image feature cannot completely express a difference between a detection target object and a background, identification based on only the image feature may be difficult. Examples of this case are a case in which the hiding of a detection target object is large, and a case in which the diversity of the shape of a detection target object is large. When identification based on only an image feature is difficult, identification based on information other than the image feature needs to be performed. For example, when appearance position information of a detection object is used, it is expected to easily identify whether the object is a detection target object, while reducing the influence of hiding. A weak discriminator based on a context feature vector is newly generated in the second identification unit. This enables identification based on a context. Identification becomes possible in the above-mentioned scene regardless of the image feature, and improvement of the detection rate can be expected.

The effect of the weak discriminator that identifies an image feature vector and a context feature vector will be explained. Depending on a scene, there is some relevance between an image feature and a context feature. For example, when the context is appearance position information of a detection target object, an image feature useful for identification sometimes changes depending on the appearance position of the detection target object. For example, a useful image feature may be different between a high-resolution object present close and a low-resolution object present apart. Other examples are a case in which hiding may be present or absent depending on the appearance position and a specific change is generated in the appearance of a detection target object, and a case in which an illumination condition changes depending on the appearance position and the shades of a detection target object and background change. In this embodiment, therefore, a weak discriminator based on both an image feature vector and a context feature vector is newly generated in the second identification unit. Identification based on the relevance between an image feature and a context feature becomes possible, and improvement of the detection rate can be expected.

As described above, according to this embodiment, a weak discriminator based on not only an image feature but also context information is generated. More specifically, the discriminator candidate generation unit generates weak discriminator candidates based on the first likelihood obtained by the first identification unit and context information, and the discriminator selection unit selects a desired discriminator to constitute a second identification unit. As a result, context information can be added.

Second Embodiment

In the first embodiment, the context feature vector is $c=(y/h, 1/h)$. However, in step S304, a numerical value or attribute label representing the time, date, day of the week, month, season, or another time may be obtained as a context feature vector. Alternatively, a numerical value or attribute label representing the weather, ambient temperature, humidity, air pressure, precipitation, snow accumulation, wind direction, wind speed, sun direction, solar radiation, fog thickness, visibility, or another climate condition may be obtained as a context feature vector. For example, letting t be the time, the context feature vector may be obtained as $c=(t)$.

Of these contexts, a context representing the time may be obtained from a timepiece, or a context representing the climate condition may be obtained from a sensor. Such a context may be input manually by a man or externally via a network. A context that generates a visual change, such as the sun direction, may be estimated from a camera image.

For example, an effect when the time is used as a context feature vector will be explained. The shooting environment or the appearance of a detection target object sometimes changes depending on the time. For example, when the detection target object is a person, the shade may be different between morning and night depending on a change of the illumination condition, or the clothes or things of a person may change. In such a case, the image feature of a background or detection target object is considered to change depending on the time. By changing the image feature use method in accordance with the time, improvement of the identification performance is expected.

Even when another feature regarding the time or another feature regarding the climate condition is used as a context feature vector, the same effect can be expected. That is, since a change corresponding to a context is generated in the image feature of a background image or detection target object, improvement of the identification performance is expected by changing the image feature use method in accordance with the context.

Since a context such as the time or climate condition is independent of the position of a detection target object, the context can be learnt even in a scene in which the camera is not fixed.

In order to obtain the relevance between an image feature and a context feature, the joint probability distribution of them may be taken into account. When equation (13) is adopted as a weak discriminator candidate, $P(y=+1|x)$ and $P(y=-1|x)$ in equation (13) may be the joint probability density distributions of an image feature and context feature that are weighted by the weight of a learning sample. More specifically, the joint probability density distributions are expressed as two-dimensional histograms $W_+^{j,k}$ and $W_-^{j,k}$. The two-dimensional histograms $W_+^{j,k}$ and $W_-^{j,k}$ are calculated by converting a feature amount into a bin number based on conversion tables J and K, and integrating a learning sample weight corresponding to the bin:

$$W_+^{j,k} = \sum_{i:J(u_i)=j \cap K(t_i)=k \cap y_i=+1} w_i \quad (17)$$

$$W_-^{j,k} = \sum_{i:J(u_i)=j \cap K(t_i)=k \cap y_i=-1} w_i$$

-continued $$z = 2\sum_{j,k} \sqrt{W_+^{j,k} W_-^{j,k}}$$

where j and k are the row number and column number of the bin of the two-dimensional histogram, respectively, i is the number of the sample, $u_i$ is the image feature vector element value, J is the conversion table for converting the value of the image feature into the row number of the bin of the two-dimensional histogram, $t_i$ is the time, and K is the conversion table for converting the time into the column number of the bin of the two-dimensional histogram.

As a weak discriminator candidate, approximation (14) may be employed instead of equation (13). In this case, a one-dimensional histogram representing the probability density distributions $W_+^j$, $W_-^j$, P(c|y=+1) and P(c|y=−1) weighted by a learning sample is created for each of an image feature and context feature. z in equations (17) is used as the evaluation score of a weak discriminator.

Third Embodiment

In the first embodiment, the context feature vector is c=(y/h, 1/h). However, in step S304, a desirable one of the height h and width w of the extraction frame of an image and the x- and y-coordinates of a specific location in the detection frame, or a combination of desirable ones of them may be obtained as a context feature vector. For example, c=(x, y, y/h). This produces an effect of distinguishing a region where a detection target object tends to appear, and a region where it hardly appears. For example, when the detection target object is a human body and there is a wall surface in a scene, the human body does not exist inside the wall surface, and a region where the human body can exist and a region where it cannot exist can be distinguished using the x- and y-coordinates.

In this case, to generate in step S505 a weak discriminator candidate that identifies a context feature vector, the joint probability density distribution of a set of one or a plurality of elements of context feature vectors may be calculated as P(c|y=+1) and P(c|y=−1) in equation (9). To generate in step S508 a weak discriminator candidate that identifies an image feature vector and a context feature vector, the joint probability density distribution of an image feature vector and context feature vector may be calculated as P(x|y=+1) and P(x|y=−1) in equation (13). When calculating this joint probability density distribution, maximum likelihood estimation may be performed by application to a desired model as in equation (11). Alternatively, the joint probability density distribution may be obtained by voting or kernel density estimation.

Fourth Embodiment

Figure 9:
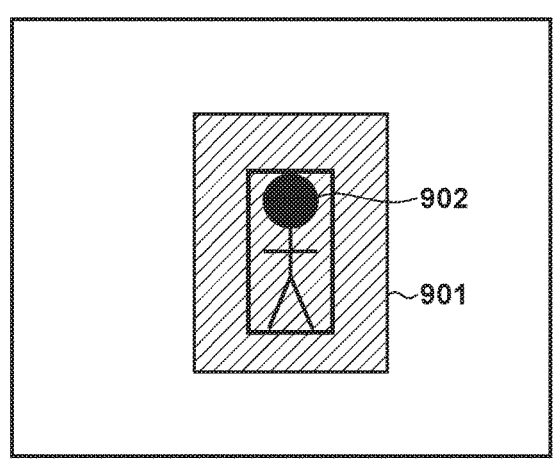
FIG. 9 is a view for explaining a context feature vector.

In the first embodiment, the context feature vector is c=(y/h, 1/h). However, in step S304, the image feature vector of a partial image around a detection target region, including the detection target region, may be obtained as the context feature vector c. More specifically, an image feature vector r is extracted from a hatched region 901 around a detection target region 902 in FIG. 9, and set as the context feature vector c. That is, c=r. The HOG, the LBP, the luminance value of an image, the output value of the first identification unit, or another feature amount may be used as an image feature for obtaining the context feature vector. In this case, a weak discriminator that identifies a context feature vector, as represented by equation (9), may have the same format as that of a weak discriminator that identifies an image feature vector, as represented by equation (6).

The effect of this embodiment will be explained. In some cases, the appearance frequency of a detection target object and a background image have a specific relevance. For example, a human body tends to appear at a position having a texture or color representing that the surface beneath the feet seems to be a road. In such a case, a background image can be learnt by learning a partial image around a detection target region, including the detection target region, and improvement of the detection performance can be expected.

Fifth Embodiment

In the first embodiment, the context feature vector is c=(y/h, 1/h). However, in step S304, motion information of a moving image may be obtained as a context feature vector. More specifically, letting m be a feature vector representing motion information, the context feature vector is c=m. As the motion information, the optical flow of a detection target region may be used, or an inter-frame difference image or a background difference image may be used. A coordinate value representing the locus of an object may be used as motion information.

An effect of using motion information as a context feature vector will be explained. When the detection target object is a moving object, it is considered that motion information is different between the detection target object and the background. For example, when the motion information is an optical flow, it is expected that the direction and intensity of the optical flow are different between the detection target object and the background. Since the motion information is a useful feature for separating the detection target object and the background, improvement of the identification performance is expected by generating a weak discriminator that identifies motion information.

When motion information robust to a camera motion is used, a context can be learnt even in a scene in which the camera is not fixed. An example of motion information robust to a camera motion is information obtained by subtracting the average of the optical flow of an entire image from the optical flow of a detection target region.

As a weak discriminator that identifies motion information in equation (9), a weak discriminator that uses a desired motion feature by feature selection, such as a weak discriminator that identifies an image feature in equation (6), may be generated. As a weak discriminator that identifies an image feature and motion information in equation (13), a weak discriminator that considers the cooccurrence of an image feature and motion feature may be generated.

Sixth Embodiment

In the first embodiment, the context feature vector is c=(y/h, 1/h). However, in step S304, a numerical value or attribute label obtained by a sensor installed in an environment may be obtained as a context feature vector. More specifically, an infrared sensor, a distance sensor, a temperature sensor, a microphone, an invisible light camera image, a floor pressure sensor, or another sensor may be used. Further, a distance measurement sensor, an exposure meter, or another sensor incorporated in a camera may be used.

An effect when information obtained by a sensor installed in an environment is used as a context feature vector will be explained. It is expected that the appearance frequency of a detection target object that varies in accordance with a change of sensor information can be considered, and improvement of the identification performance can be expected. For example, the fact that the likelihood at which a detection target object exists in a scene changes depending on the presence/absence of detection of the detection target object by an area sensor can be used for identification. By combining sensor information with an image feature, identification considering a change of the shooting environment or the appearance of a detection target object in accordance with a change of sensor information becomes possible, and improvement of the identification performance can be expected. For example, when the appearance (for example, clothes) of a detection target object changes in accordance with a temperature obtained from a temperature sensor, the image feature use method can be changed in accordance with the temperature, and improvement of the identification performance is expected.

Seventh Embodiment

In step S304, the degree of congestion of a scene may be obtained as a context feature vector. When the detection target object is a person, the degree of congestion may be the density of persons in a scene, the average value of the distance between persons, or the ratio of pixels belonging to a moving object to the pixels of an image obtained from a scene.

The degree of congestion of a scene may be estimated from the detection result of a detection target object, estimated from a moving object detection result in a scene, or designated manually. Further, the degree of congestion of a scene may be obtained from a sensor installed in a scene. The degree of congestion may be obtained as a uniform degree in an entire image obtained from a scene, or obtained as a degree that changes depending on the position.

An effect when the degree of congestion of a scene is used as a context feature vector will be explained. The image feature and the degree of congestion sometimes have relevance. For example, when the detection target object is a person, an image feature useful for identification is sometimes different between a case in which persons overlap each other and a case in which persons do not overlap each other. Since the background is shielded, an image feature useful for identification may change. By introducing the degree of congestion, the image feature use method can be changed in accordance with the degree of congestion, and improvement of the identification performance is expected.

Eighth Embodiment

In step S304, a combination of a plurality of types of contexts may be obtained as a context feature vector. An example is a combination of position information of a detection target object and the time.

In step S403, a weak discriminator candidate utilizing cooccurrence between an arbitrary combination of contexts may be generated, a weak discriminator candidate may be generated for a plurality of types of contexts, or both of these weak discriminator candidates may be generated. As the weak discriminator utilizing cooccurrence, a weak discriminator based on the joint probability density distribution is generated, as in the second embodiment. By using a plurality of types of contexts, identification methods are increased, the relevance between an image feature and each context can be used for identification, and improvement of the identification performance can be expected.

Ninth Embodiment

In step S304, a numerical value or attribute label representing the working situation or operation situation of an apparatus installed in an environment may be obtained as a context feature vector. Examples are the presence/absence of opening/closing of an automatic door or manual door, the open/close time, and the opening/closing history. Other examples are the presence/absence of the operation of office equipment such as a personal computer or copy machine, a machine tool, or another apparatus, the operation time, and the operation history. The numerical value or attribute label representing the working situation or operation situation of an apparatus installed in an environment may be obtained from a sensor attached to the apparatus, or estimated from a camera image.

An effect of using, as a context feature vector, the numerical value or attribute label representing the working situation or operation situation of an apparatus installed in an environment will be explained. In some cases, the working situation or operation situation of an apparatus, and the appearance frequency or appearance location of a detection target object have relevance. A case in which the detection target is a person will be exemplified. When an automatic door or a manual door is opened/closed, it is generally considered that a person who is to pass the door exists near the door. When the apparatus is operated, it is considered that a person who operated the apparatus exists near the apparatus. In this manner, the working situation or operation situation of an apparatus, and the likelihood of the presence of a detection target object have relevance. By learning the relevance between them, improvement of the identification performance is expected. As the weak discriminator, for example, a weak discriminator based on the joint probability density distribution of the attribute label representing the working situation of the apparatus and position information of the detection target object may be generated.

10th Embodiment

In the first embodiment, the first and second identification units constitute discriminators as sets of weak discriminators. It is known that when a cascade arrangement in which a plurality of sets of weak discriminators, called stages, are series-arranged is employed, as in non-patent literature 3 (Paul Viola and Michael Jones, "Robust Real-time Object Detection", IJCV2001), evaluation of the series of weak discriminators can be ended halfway at the time of detection processing, and the detection processing amount reduction effect is obtained.

A cascade arrangement in which the first identification unit is configured as the first stage and the second identification unit is configured as the second stage may be employed. A soft cascade or multi-exit cascade arrangement, as a kind of cascade arrangement as described in non-patent literature 4 (Lubomir Bourdev and Jonathan Brandt, "Robust Object Detection Via Soft Cascade", CVPR2005), may be employed. In this arrangement, sets of weak discriminators of the first and second identification units are integrated and then divided into stages. It is also possible to arrange, in a weak discriminator at the end of each stage, a mechanism that ends calculation halfway based on the integrated value of the likelihood of the weak discriminator according to the framework of the cascade discriminator, and forcibly classify a partial image of a detection processing target image as a background image.

11th Embodiment

The first identification unit may be constituted by a cascade discriminator, as in non-patent literature 3. In this case, learning is performed for each stage, as described in non-patent literature 3. More specifically, the second identification unit corresponding to each stage may be prepared, and processing complying with the flowchart of FIG. 3 may be performed for each stage in the first identification unit. By constituting the first identification unit by a cascade discriminator, the evaluation count of the weak discriminator can be decreased, and the detection processing amount reduction effect is expected.

12th Embodiment

Although the respective units shown in FIG. 1 may be constituted by hardware such as an electronic circuit, they may be constituted by software (computer programs). In this case, an apparatus capable of executing the software is applicable to an information processing apparatus having the arrangement shown in FIG. 1. For example, an image capturing apparatus having the arrangement as shown in FIG. 2 is applicable to the information processing apparatus having the arrangement shown in FIG. 1.

Figure 2:
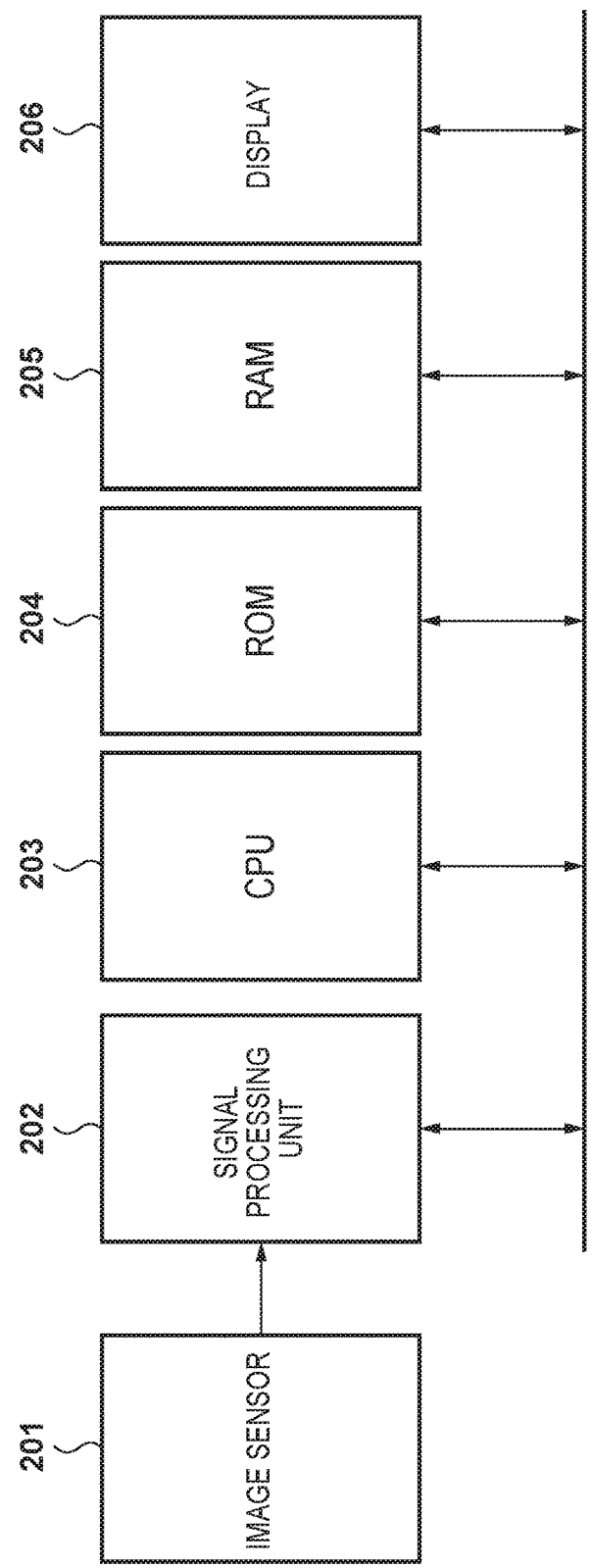
FIG. 2 is a block diagram showing an example of the hardware arrangement of an image capturing apparatus.

Referring to FIG. 2, an image sensor 201 is formed from a CCD, MOS, or the like. The image sensor 201 converts external light into an analog electric signal, and outputs the signal. A signal processing unit 202 converts the analog electric signal into a digital electric signal, and sends the digital electric signal as an input image to a RAM 205.

A ROM 204 stores setting data and activation programs for this apparatus, and computer programs and data for causing a CPU 203 to execute the functions of the respective units shown in FIG. 1 (for causing the CPU 203 to execute processes complying with the above-described flowcharts). The ROM 204 also stores various kinds of information described above, as known pieces of information.

The CPU 203 controls the operation of the whole apparatus by executing various kinds of processes using computer programs and data stored in the ROM 204 and the RAM 205. In addition, the CPU 203 executes the processes that have been described to be performed by the information processing apparatus to which this apparatus is applied. The CPU 203 may extract, as an identification target image, an image in a specific region (this region may be detected by recognizing an identification target object from an image, or designated by the user by operating an operation unit (not shown)) from an input image stored in the RAM 205 by the signal processing unit 202.

The RAM 205 has an area for temporarily storing input images and the like sent from the signal processing unit 202, a work area used when the CPU 203 executes various processes, and the like. In other words, the RAM 205 can appropriately provide various areas.

A display 206 is formed from a liquid crystal screen or the like, and can display the result of processing by the CPU 203 as an image, character, or the like. For example, the display 206 displays a screen for inputting various instructions such as region designation by the user, and the result of processing by an integrated identification unit 108. Some of the respective units shown in FIG. 1 may be implemented by hardware such as an electronic circuit.

When an identification unit 101 and a learning unit 111 are handled as separate apparatuses, the image capturing apparatus as shown in FIG. 2, and the apparatus capable of executing the software, as described above, may be applied to the respective apparatuses.

An apparatus (for example, a general personal computer) having an arrangement remaining after omitting the image sensor 201 and the signal processing unit 202 from the arrangement of FIG. 2 may be applied instead of the image capturing apparatus in FIG. 2.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus comprising:
   one or more processors; and
   a memory coupled to the one or more processors, the memory having stored thereon instructions which, when executed by the one or more processors, cause the apparatus to:
   obtain a feature amount from an input image;
   obtain context information representing a context regarding the input image, wherein the context information includes a position and size of the input image in an original image from which the input image has been extracted;
   obtain, from the feature amount, a first likelihood indicating a likelihood at which the input image is an image of a specific object;
   obtain, from the context information, a second likelihood indicating a likelihood at which the input image is an image of the specific object; and identify, by using the first likelihood and the second likelihood, whether the input image is an image of the specific object, wherein the obtaining of the second likelihood is performed by a discriminator which has been learned using the first likelihood and the context information.

2. The apparatus according to claim 1, wherein the discriminator has been selected from candidates of the discriminator generated using the first likelihood and the context information.

3. The apparatus according to claim 2, wherein the candidates of the discriminator have been generated further using a weight set based on the first likelihood for a sample obtained by joining the feature amount and the context information.

4. An information processing apparatus comprising:
one or more processors; and
a memory coupled to the one or more processors, the memory having stored thereon instructions which, when executed by the one or more processors, cause the apparatus to:
obtain a feature amount from an input image;
obtain context information representing a context regarding the input image, wherein the context information includes a position and size of the input image in an original image from which the input image has been extracted;
obtain, from the feature amount, a first likelihood indicating a likelihood at which the input image is an image of a specific object; and
learn a discriminator being different from a discriminator for obtaining the first likelihood from the feature amount by using the first likelihood and the context information.

5. The apparatus according to claim 4, wherein in the learning, the instructions, when executed by the one or more processors, cause the information processing apparatus to:
generate candidates of a discriminator by using the first likelihood and the context information; and
select at least one candidate from the candidates of the discriminator based on an evaluation score obtained for each of the candidates of the discriminator.

6. An information processing method for an information processing apparatus, the information processing method comprising:
obtaining a feature amount from an input image;
obtaining context information of the information processing apparatus, to obtain context information representing a context regarding the input image, wherein the context information includes a position and size of the input image in an original image from which the input image has been extracted;
obtaining, from the feature amount, a first likelihood indicating a likelihood at which the input image is an image of a specific object;
obtaining, from the context information, a second likelihood indicating a likelihood at which the input image is an image of the specific object; and
identifying, by using the first likelihood and the second likelihood, whether the image is an image of the specific object, wherein the obtaining of the second likelihood is performed by a discriminator which has been learned using the first likelihood and the context information.

7. An information processing method for an information processing apparatus, the information processing method, comprising:
obtaining a feature amount from an input image;
obtaining context information representing a context regarding the input image, wherein the context information includes a position and size of the input image in an original image form which the input image has been extracted;
obtaining, from the feature amount, a first likelihood indicating a likelihood at which the input image is an image of a specific object; and
learning a discriminator being different from a discriminator for obtaining the first likelihood from the feature amount by using the first likelihood and the context information.

8. A non-transitory computer-readable storage medium storing a computer program for causing a computer to execute a method of controlling an information processing apparatus, the method comprising:
obtaining a feature amount from an input image;
obtaining context information representing a context regarding the input image, wherein the context information includes a position and size of the input image in an original image from which the input image has been extracted;
obtaining, from the feature amount, a first likelihood indicating a likelihood at which the input image is an image of a specific object;
obtaining, from the context information, a second likelihood indicating a likelihood at which the input image is an image of the specific object; and
identifying, by using the first likelihood and the second likelihood, whether the input image is an image of the specific object,
wherein the obtaining of the second likelihood is performed by a discriminator which has been learned using the first likelihood and the context information.

9. A non-transitory computer-readable storage medium storing a computer program for causing a computer to execute a method of controlling an information processing apparatus, the method comprising:
obtaining a feature amount from an input image;
obtaining context information representing a context regarding the input image, wherein the context information includes a position and size of the input image in an original image form which the input image has been extracted;
obtaining, from the feature amount, a first likelihood indicating a likelihood at which the input image is an image of a specific object; and
learning a discriminator being different from a discriminator for obtaining the first likelihood from the feature amount by using the first likelihood and the context information.

* * * * *